United States Patent
Osborne et al.

(10) Patent No.: US 9,995,763 B2
(45) Date of Patent: Jun. 12, 2018

(54) PRECISE PROBE PLACEMENT IN AUTOMATED SCANNING PROBE MICROSCOPY SYSTEMS

(71) Applicant: Bruker Nano, Inc., Tucson, AZ (US)

(72) Inventors: Jason Osborne, Lompoc, CA (US);
Eric Milligan, Santa Barbara, CA (US);
Andrew Lopez, San Jose, CA (US);
Xianghai Wu, Santa Barbara, CA (US);
Sean Hand, Santa Barbara, CA (US);
Vladimir Fonoberov, Santa Barbara, CA (US)

(73) Assignee: Bruker Nano, Inc., Tucson, AZ (US)

(*) Notice: Subject to any disclaimer, the term of this patent is extended or adjusted under 35 U.S.C. 154(b) by 0 days. days.

(21) Appl. No.: 14/630,074

(22) Filed: Feb. 24, 2015

(65) Prior Publication Data

US 2015/0241469 A1    Aug. 27, 2015

Related U.S. Application Data

(60) Provisional application No. 61/943,802, filed on Feb. 24, 2014.

(51) Int. Cl.
| | | |
|---|---|---|
| *G01Q 10/02* | (2010.01) | |
| *G01Q 10/06* | (2010.01) | |
| *G01Q 30/06* | (2010.01) | |

(52) U.S. Cl.
CPC ........... *G01Q 10/02* (2013.01); *G01Q 10/065* (2013.01); *G01Q 30/06* (2013.01)

(58) Field of Classification Search
None
See application file for complete search history.

(56) References Cited

U.S. PATENT DOCUMENTS

| | | |
|---|---|---|
| RE34,489 E | 12/1993 | Hansma et al. |
| 5,744,799 A | 4/1998 | Ohara |

(Continued)

FOREIGN PATENT DOCUMENTS

| | | |
|---|---|---|
| EP | 0020982 B1 | 6/1983 |
| EP | 0143893 B1 | 6/1988 |

(Continued)

OTHER PUBLICATIONS

International Search Report and Written Opinion, for PCT Application No. PCT/2015/017319, dated May 29, 2015, 12 pages.

(Continued)

*Primary Examiner* — Jason McCormack
*Assistant Examiner* — Sean Luck
(74) *Attorney, Agent, or Firm* — Patterson Thuente Pedersen, P.A.

(57) ABSTRACT

A scanning probe microscope (SPM) system and associated method. The SPM system having a probe adapted to interact with nanoscale features of a sample and scan within a target region to produce a three-dimensional image of that target region, the system maintaining location information for a plurality of features of interest of the sample according to a sample-specific coordinate system, wherein the SPM system is configured to adjust positioning of the probe relative to the sample according to a SPM coordinate system, the SPM system further configured to manage a dynamic relationship between the sample-specific coordinate system and the SPM coordinate system by determining a set of alignment errors between the sample-specific coordinate system and the SPM coordinate system and apply corrections to the SPM coordinate system to offset the determined alignment errors.

23 Claims, 6 Drawing Sheets

(56) References Cited

U.S. PATENT DOCUMENTS

| | | | |
|---|---|---|---|
| 5,898,106 A * | 4/1999 | Babcock | G01B 7/34 73/1.89 |
| 6,392,229 B1 * | 5/2002 | Dana | G03F 7/70633 250/423 F |
| 7,472,576 B1 * | 1/2009 | Moeck | B82Y 35/00 29/592 |
| 7,627,438 B1 | 12/2009 | Salapaka et al. | |
| 8,595,859 B1 | 11/2013 | Rankl et al. | |
| 2002/0121131 A1 * | 9/2002 | Mancevski | B82Y 35/00 73/105 |
| 2002/0130274 A1 * | 9/2002 | Ferrera | B82Y 10/00 250/492.1 |
| 2002/0158197 A1 * | 10/2002 | Dana | G03F 7/70633 250/306 |
| 2002/0189330 A1 * | 12/2002 | Mancevski | B82Y 35/00 73/105 |
| 2003/0185967 A1 * | 10/2003 | Eby | B82Y 35/00 427/8 |
| 2004/0089816 A1 * | 5/2004 | Quake | G01Q 30/04 250/458.1 |
| 2004/0213443 A1 * | 10/2004 | Haussecker | B82Y 35/00 382/128 |
| 2005/0194534 A1 * | 9/2005 | Kneedler | G01Q 30/04 250/307 |
| 2005/0269495 A1 * | 12/2005 | Kakemizu | B82Y 35/00 250/234 |
| 2006/0097162 A1 * | 5/2006 | Maruyama | G01Q 10/04 250/309 |
| 2006/0156798 A1 * | 7/2006 | Mancevski | B82Y 10/00 73/105 |
| 2007/0075243 A1 * | 4/2007 | Kneeburg | B82Y 35/00 250/306 |
| 2007/0227235 A1 * | 10/2007 | Anazawa | G01B 7/06 73/105 |
| 2008/0121813 A1 | 5/2008 | Young | |
| 2008/0308726 A1 * | 12/2008 | Jahnke | B82Y 35/00 250/306 |
| 2009/0077697 A1 * | 3/2009 | Su | G01Q 10/06 850/52 |
| 2009/0218488 A1 * | 9/2009 | Wells | H01J 37/3056 250/307 |
| 2010/0092070 A1 * | 4/2010 | Young | H01J 37/222 382/151 |
| 2010/0325761 A1 * | 12/2010 | Nakata | B82Y 15/00 850/33 |
| 2011/0035848 A1 * | 2/2011 | Perkins | B82Y 35/00 850/3 |
| 2011/0138505 A1 * | 6/2011 | Zhou | B82Y 35/00 850/1 |
| 2011/0296561 A1 * | 12/2011 | Humphris | B82Y 35/00 850/4 |
| 2012/0195490 A1 | 8/2012 | Langmans et al. | |
| 2012/0328151 A1 * | 12/2012 | Warschauer | G06T 7/0042 382/103 |
| 2013/0031680 A1 * | 1/2013 | Liu | G01Q 30/04 850/18 |
| 2013/0204569 A1 | 8/2013 | Goren et al. | |
| 2013/0284924 A1 * | 10/2013 | Mizuochi | G01N 23/2206 250/310 |

FOREIGN PATENT DOCUMENTS

| | | |
|---|---|---|
| JP | 2001324438 A | 11/2001 |
| KR | 20060015394 A | 2/2006 |

OTHER PUBLICATIONS

EP Application No. 15752506.4, Extended European Search Report dated Sep. 22, 2017, 9 pages.

* cited by examiner

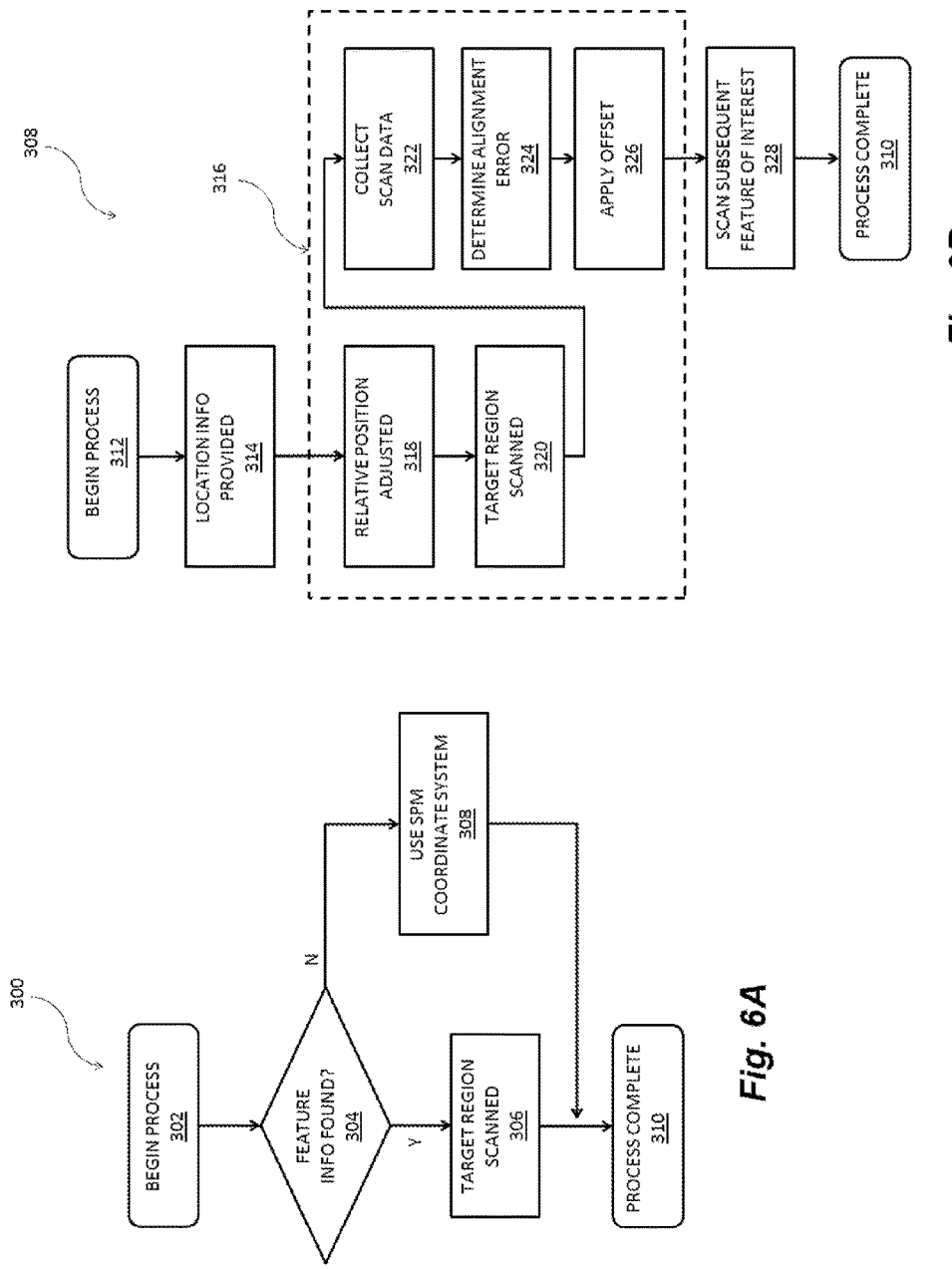

PRECISE PROBE PLACEMENT IN AUTOMATED SCANNING PROBE MICROSCOPY SYSTEMS

RELATED APPLICATION INFORMATION

This application claims the benefit of U.S. Provisional Application 61/943,802, filed Feb. 24, 2014, which is hereby incorporated by reference.

TECHNICAL FIELD

The invention relates generally to scanning probe microscopy (SPM) and, more particularly, to controlling the probe positioning actuators of an automated scanning probe microscope to rapidly re-position the SPM probe onto a feature of interest.

BACKGROUND

Scanning probe microscopes (SPMs), such as the atomic force microscope (AFM), are instruments which typically use a sharp tip to characterize the surface of a sample down to nanoscale dimensions. The term nanoscale as used for purposes of this disclosure refers to dimensions smaller than one micrometer. SPMs monitor the interaction between the sample and the probe tip. By providing relative scanning movement between the tip and the sample, surface characteristic data can be acquired over a particular site on the sample, and a corresponding map of the site can be generated. Because of their resolution and versatility, SPMs are important measurement devices in many diverse fields ranging from semiconductor manufacturing to biological research. In other applications, SPM systems may be used for measuring nanomechanical properties of a sample.

The probe of a typical SPM includes a very small cantilever fixed to a support at its base and having a sharp probe tip extending from the opposite, free end. The probe tip is brought very near to or into contact with a surface of a sample to be examined, and the deflection of the cantilever in response to the probe tip's interaction with the sample is measured with an extremely sensitive deflection detector such as an optical lever system as described, for example, in Hansma et al. U.S. Pat. No. RE 34,489, or some other deflection detector such as strain gauges, capacitance sensors, etc. The probe is scanned over a surface using a high resolution three-axis scanner acting on the sample support, the probe, or a combination of both. The instrument is thus capable of creating relative motion between the probe and the sample while measuring the topography or other surface properties or nanomechanical properties of the sample.

Different SPM probe tip shapes are used for a variety of applications. One type of tip shape that is commonly used for measuring the height of certain nanoscale features, for testing material properties (e.g. elastic modulus), or for manipulating very small objects is a pointed shape (e.g. parabolic) having a relatively simple profile. To image or measure surface features such as vertical sidewalls and undercut regions, and to take critical dimension (CD) measurements, SPMs utilize more complex probe tip shapes, such as boot-shaped or inverted mushroom-shaped probe tips, some of which may have one or more protrusions along the scanning direction.

SPMs may be configured to operate in a variety of modes, including modes for measuring, imaging, or otherwise inspecting a surface, and modes for measuring nanomechanical properties of a sample. In a contact mode operation, the microscope typically scans the tip across the surface of the sample while maintaining a constant probe-sample interaction force. In an oscillation mode of operation, sometimes referred to as tapping mode, the tip of the SPM is oscillated while interacting with the sample at or near a resonant frequency of the cantilever of the probe. The amplitude or phase angle of this oscillation is affected by the probe-sample interaction, and changes in the oscillation are sensed.

As the probe is scanned over the surface of the sample, a probe positioning control system monitors the interaction of the probe with the sample surface such as, for example, deflection of the cantilever (in the case of contact mode), or changes in the oscillation amplitude or phase angle (in the case of oscillating mode). The control system adjusts the probe's position (or average position in the case of oscillating mode) relative to the sample to maintain a constant probe-sample interaction. The position adjustment thus tracks the topography of the sample. In this way, the data associated with the position adjustment can be stored, and processed into data that characterizes the sample. This data can be used to construct an image of the inspected sample's surface, or to make certain measurements of selected surface features (such as, for example, a height of the feature).

The probe position adjustment is effected by a cantilever positioning actuator that is driven by a driving circuit. Various technologies for cantilever actuators are known, including piezoelectric and magnetic transducers. The driving circuit generates a probe positioning signal, and amplifies the probe positioning signal to produce a driving signal that is applied to the actuator. The driving signal continuously repositions the probe's separation distance from the sample to track an arbitrary topography of the sample's surface. Accordingly, the driving signal has a bandwidth from zero hertz to a frequency associated with the maximum operating bandwidth of the SPM, which corresponds to the maximum speed at which the probe can track the topography of the surface of the sample.

Inspection of a sample, in particular, the inspection of a wafer sample entails positioning of the probe at a precise location on the sample so that certain parts of the wafer can be scanned and a topographic image of the feature of interest on the wafer can be obtained. To do this, wafer registration points are identified and an x-y coordinate system or navigation coordinate system is built into the SPM that positions the probe in relation to these registration points.

Defect monitoring and review of the quartz thickness in the semiconductor manufacturing industry for today's advanced integrated circuits is done to ensure the fidelity of the wafer print. It is important that quartz depth differences be tightly controlled in mask production. Thus, a SPM has sub nanometer depth metrology precision over a range from angstroms to microns and is used for metrology in the vertical or depth/height direction, metrology for line or trench width, sidewall angle, line edge roughness (LER), line width variation (LWV) and sidewall roughness (SWR). In addition, SPM provides key three-dimensional, topographical information for defect review. SPM thus permits a more accurate classification of defects and thus a faster time to solution for eliminating the defects.

For both metrology and defect review, image placement accuracy is a key factor in the total measurement uncertainty. Conventional automated SPM systems employ an optical microscope and video imaging system to scan and capture wafer feature information relative to unique locations on a wafer. This feature information is used to define a wafer based coordinate system, which is then correlated to the SPM system coordinate system for navigation to features of interest for subsequent imaging and inspection with the SPM probe tip.

Various registration calibration schemes are employed; wherein a single point, or a plurality of points, on the wafer is scanned and captured to define the origin and ordinate axes of the wafer coordinate system, as well as, the rotation of the wafer from loading onto the stage and the residual orthogonality and scale errors present. Contributing to navigation inaccuracy are uncertainties arising from scanning the features used as the baseline marks in the definition of the origin and deskew points in wafer registration locations. For example, the error resulting associated with the definition of the origin location can result in a systematic bias in locating other features on the wafer at least equal to the error term in the origin definition.

Two primary sources of location uncertainty exist in wafer registration for all SPM systems that employ an optical microscope for navigation. The first source is the minimum pixel resolution of the video capture system. Even when inter-pixel interpolation is used, non-negligible location accuracy errors can cause future unacceptable navigation inaccuracy to features of interest due to the inaccuracy in the video capture system definition of wafer feature location. The second source is a result of the physical offset between the probe tip and the center of the video field of view. This physical offset must be calibrated and corrected for in any navigational moves that bring the probe tip in contact with the region of interest of the sample surface that was previously defined/imaged in the video capture system. While there are well known methods to calibrate and correct these offsets, there still remain non-negligible errors from this offset calibration that can easily exceed the required navigation accuracy requirements of many applications. In addition, conventional video based wafer registration systems have the added issues of excessive scanning time due to the added complexity of obtaining acceptable navigation accuracy and the mechanical degradation of the probe tips.

What is needed in the industry is a system and method that negates the navigation inaccuracy to features of interest, while improving scanning time and limiting probe degradation in scanning probe microscopy.

SUMMARY OF THE DISCLOSURE

Embodiments of the present disclosure meet the need of the industry for improved SPM probe tip placement accuracy and measurement automation throughput, while advantageously reducing the effect of uncertainties in defining coordinate registration locations. One embodiment of the present disclosure provides a scanning probe microscope (SPM) system and method for characterizing target regions of a sample. In one embodiment, the SPM system has a probe including a tip having an apex adapted to interact with nanoscale features of the sample, wherein the relative position of the apex and specific nanoscal features of the sample is not visually observable. The SPM system further includes a sample data module, a probe positioning system, a SPM coordinate registration module, and a SPM coordinate registration module.

The sample data module maintains location information for each of a plurality of features of interest in remote regions of the sample according to a sample-specific coordinate system and also maintains feature identification information for each of the plurality of features of interest. In one embodiment, the feature identification information includes the structural properties of the respective feature of interest.

The probe positioning system includes actuators and actuator control circuitry configured to adjust a relative positioning between the probe and the sample with sub-micron resolution according to a SPM coordinate system. In some embodiments, adjustment of the relative positioning includes shuttling of the relative positioning between the probe and the sample to globally reposition the probe to specific locations in remote regions of the sample, as well as scanning within a target region to cause interaction of the probe tip and the nanoscale features of the sample to produce a three-dimensional image of that target region.

The SPM coordinate registration module manages a dynamic relationship between the sample-specific coordinate system and the SPM coordinate system. In some embodiments, the SPM coordinate registration module determines a set of alignment errors between the sample-specific coordinate system and the SPM coordinate system based on a scan of at least one of the plurality of features of interest and on the feature identification information, and applies the corrections to the SPM coordinate system to offset the determined alignment errors.

The scan region selection control module is operatively coupled to the probe positioning system and the SPM coordinate registration module. In one embodiment, the scan region selection control module causes the probe positioning system to shuttle the relative positioning between the probe and the sample from an initial position on the sample to a subsequent position on the sample corresponding to a sub-micron remote region of the sample in which a subsequent one of the plurality of features is located. In one embodiment, the scan region selection control module performs a scan of the subsequent one of the plurality of features and causes the SPM coordinate registration module to update the set of alignment errors and applies updated corrections to the SPM coordinate system.

In one embodiment, at least one of the features of interest includes a fiducial marker. For example, the initial position can, in some embodiments, be a fiducial marker. In one embodiment, at least one of the features of interest can be located in a region that is remote from the region where another feature of interest is located. For example, the position of subsequent feature of interest could be remote from the position of an initial feature of interest. In one embodiment, the initial and subsequent regions where the respective features of interest on the sample are located are at least 1 centimeter apart. In another embodiment, the initial and subsequent regions are at least 1000 microns apart. In another embodiment, the initial and subsequent regions are at least 100 microns apart. In one embodiment, scanning inspection is suspended while shuttling the relative positioning between the probe and the sample from an initial position to a subsequent position.

In one embodiment, the probe is a critical dimension (CD) probe that enables highly linear measurements over a range of line-widths and of undercut features. In one embodiment, probe is formed as a boot-shaped CD atomic force microscope (AFM) probe.

In one embodiment, the scanning probe microscope system further includes a course positioning system configured to establish at least preliminary positioning of the probe relative to the sample. In one embodiment, the course positioning system is used when shuttling the relative positioning between the probe and the sample from an initial position on the sample to a subsequent position on the sample. In one embodiment, the course positioning system lacks the sub-micron resolution corresponding to the standard range of motion or amplitude of the probe relative to the sample during scanning inspection. For example, in one embodiment, the resolution of course positioning system is greater than 1 micron. In one embodiment, the course positioning system can also require a larger field of view to determine a desired location. For example, in one embodiment, the field of view is more than 100 microns.

In one embodiment, the course positioning system can at times operate in conjunction with an optical-based positioning system. In one embodiment, the preliminary or an initial position is determined based on the optical based positioning system. In one embodiment, optical-based positioning system scans an area on the sample greater than 1 micron in diameter. In one embodiment, the optical-based positioning system is limited by its inherent imaging resolution, as the relative position of the probe apex and specific nanoscal features of the sample is not visually observable.

In some embodiments, in order to provide a higher degree of precision in adjusting the relative positioning between the probe and the sample, the course positioning system and the sub-micron resolution capabilities of the probe positioning system operate together to enable a more precise positioning. In one embodiment, the SPM system can utilize both the optical-based positioning system and the SPM coordinate system for more precise positioning or adjustment between the probe and the sample to optimize probe-sample interaction. In one embodiment, the SPM system becomes more precise as it increasingly relies on the SPM coordinate system. In particular, as opposed to the imaging resolution limitations of a purely optical-based positioning system, interaction with the SPM coordinate system allows for sub-nanometer resolution. In one embodiment, at least a portion of the SPM coordinate system data is stored as computer aided design (CAD) data. In one embodiment, a plurality of updated corrections are applied to the SPM coordinate system to offset determined alignment errors, thereby further increasing the accuracy of the positioning of the probe relative to sample during operation. Accordingly, embodiments of the present disclosure provide a SPM system and method whereby the amount of time spent looking for a particular feature of interest to be scanned is significantly reduced.

The summary above is not intended to describe each illustrated embodiment or every implementation of the present disclosure. The figures and the detailed description that follow more particularly exemplify these embodiments.

BRIEF DESCRIPTION OF THE DRAWINGS

The disclosure can be more completely understood in consideration of the following detailed description of various embodiments of the disclosure, in connection with the accompanying drawings, in which:

FIG. 6A is a process flow diagram depicting scanning of a sample in accordance with an embodiment of the disclosure.

FIG. 6B is a process flow diagram depicting scanning of a sample using while using an SPM coordinate system in accordance with an embodiment of the disclosure.

Figure 1:
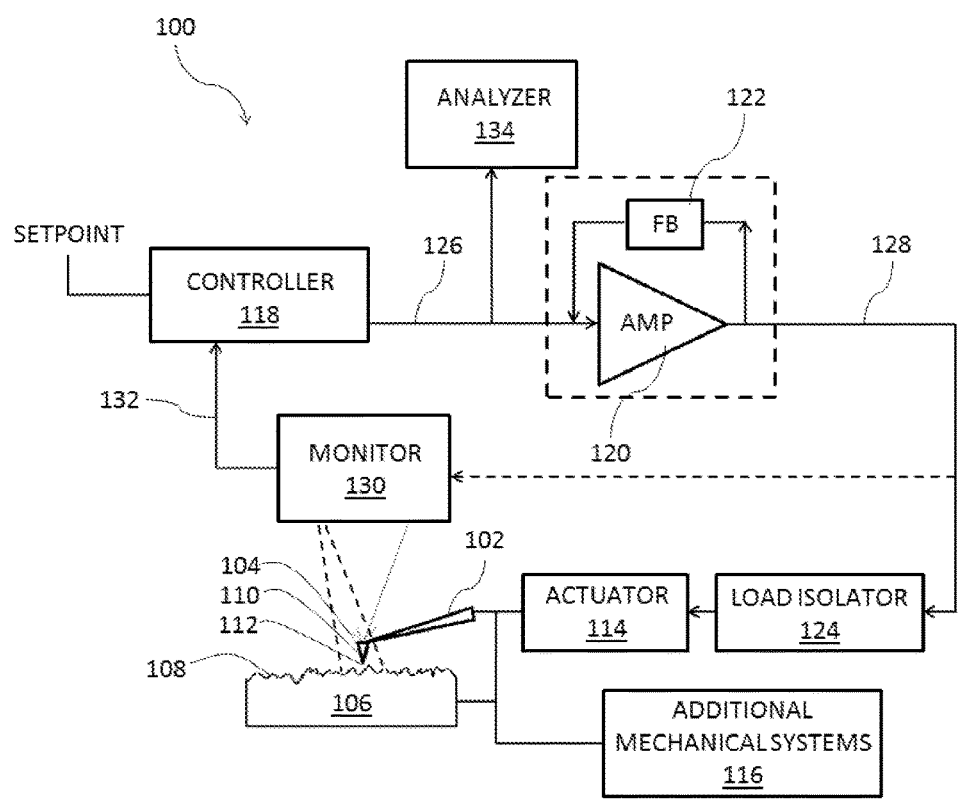
FIG. 1 is a top-level functional diagram depicting an SPM system in accordance with an embodiment of the disclosure.

While embodiments of the disclosure are amenable to various modifications and alternative forms, specifics thereof are shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure as defined by the appended claims.

DETAILED DESCRIPTION

Referring to FIG. 1, a top-level diagram illustrating a portion of a scanning probe microscope (SPM) system 100 in accordance with an embodiment of the disclosure is depicted. System 100 includes cantilever 102 that holds probe 104. Probe 104 is used to inspect sample 106. For example, various types of samples 106 can include metallurgical samples, semiconductor devices, storage devices such as disk drive platters, polymer samples, biological structures, microelectromechanical system (MEMS) structures, nanostructures, and the like. Samples 106 typically include a limited, contiguous surface 108 having a one or more features of interest to be inspected. Surface 108 can be any suitable surface that is suitable for inspection via scanning probe microscopy.

The size of a target region (i.e., an area designated for scanning) is typically governed by the desired measurement resolution, scanning or measuring speed and available range of the SPM instrument, and by time constraints. Whereas a sample 106 can have a target region on the order of hundreds of square centimeters, the target region is typically in the order of microns or even sub-microns. A given sample 106 is typically inspected at multiple specific locations where one or more feature of interest is located. For example, in a semiconductor wafer, ten or more different features of interest can be selected at specific locations on the wafer as a statistical sample set representing the overall wafer. At each specific location, a SPM typically takes certain measurements or scans the surface 108 of the sample 106 (thereby taking a sequence of measurements) in a raster line fashion according to known techniques. In some embodiments, multiple critical dimension (CD) measurements are obtained for features of interest, such as a width of a line or trench at multiple locations.

In one embodiment, probe 104 includes tip 110 having an apex 112 designed an adapted to interact with, the topography of surface 108. Probe 104 can, in some embodiments, be calibrated using National Institute of Standards and Technology (NIST) traceable standards to ensure measurement accuracy. In one embodiment, probe is a critical dimension (CD) probe that enables accurate measurement of three-dimensional (3D) features by using boot-shaped CD atomic force microscope (AFM) probe. The term topography is defined herein as a representation of a three-dimensional profile of the arrangement of the natural and artificial physical features of an area of sample 106 or of a portion of a sample 106, including, but not limited to the nanoscale features of surface 108 within a sub-micron remote target region of sample 106. The natural and artificial physical topographical features of sample 106 can, for example, include lines, troughs, walls, corners, cavities, protrusions, and the like. In one embodiment, use of probe 104 accurately provides highly linear measurements over a range of linewidths and is unaffected by feature type, density or material type. In some embodiments, scanning with probe 104 enables the measurement of undercut features.

The scanning inspection of sample 106 is accomplished by situating or positioning probe 104 relative to surface 108 by moving either cantilever 102, sample 106, or both cantilever 102 and sample 106, in order to establish a detectable interaction between sample 106 and probe 104. Probe 104 is scanned over or across sample 106 while apex 112 of probe tip 110 interacts with the nanoscale features of sample. In one embodiment, the relative position of apex 112 and the nanoscale features of the sample is not visually observable.

In one embodiment, SPM system 100 can include a probe positioning system in which actuator 114 adjusts the probe-sample interaction by moving probe 104 via cantilever 102 relative to surface 108. In related embodiments, actuator 114 can move sample 106 relative to cantilever 102, or actuator 114 can move both sample 106 and cantilever 102. In one embodiment, actuator 114 can be a piezoelectric stack. In other embodiments, the actuator 114 can employ any number of alternative actuation technologies, including but not limited to, other piezoelectric devices, actuators formed from electrostrictive, magnetorstrictive, electrostatic, inductive, and/or voice coil drive mechanisms and other actuators that generate a motion in response to an input signal. Further, persons skilled in the relevant arts will appreciate that SPM system 100 can be constructed such that the mechanical structure, including the couplings between probe 104 and sample 106, reduce or avoid damping, resonating, or otherwise interacting with the relative motion between probe 104 and the sample 106. For example, in one embodiment, actuator 114 can be fixedly coupled to a chassis to which sample 106 is also fixedly coupled.

In one embodiment, the cantilever 102 can extend substantially orthogonally to or at an oblique angle to surface 108. Cantilever 102 can also include a translational or rotational motion component along one or more planes of motion. During scanning inspection of sample 106, cantilever 102 can make frequent adjustments to maintain proper probe-sample interaction. For simplicity, the primary axis along which cantilever 102 adjusts probe 104 to maintain interaction with the topography of sample 106 will be referred to as the z-axis.

Additional mechanical systems 116 can be provided to move probe 104 and sample 106 relative to one another along other axes, such that probe 104 can move substantially parallel to surface 108, track along the surface 108 of sample 106, or be repositioned from an initial position on sample 106 to a subsequent position corresponding to a target region that is remote from the target region where the initial position is located on sample 106. For simplicity, this motion shall be termed motion in the x-y directions or along the x- or y-axes. In one embodiment, mechanical systems 116 can facilitate this movement. Mechanical systems 116 can include actuators for moving cantilever 102, sample 106, or both. In one embodiment, the actuators for positioning probe 104 along the x- and y-axes are piezoelectric stacks, or one of the other technologies referenced above.

As probe 104 is scanned over sample 108, actuator 114 adjusts the relative positioning of cantilever 102 or sample 106 to produce maintain probe-sample interaction, which results in probe 104 tracking the topography of surface 108. In one embodiment, in addition to motion along the x-y plane, mechanical systems 116 can facilitate an oscillatory motion of cantilever 102. In oscillating mode systems, the probe-sample interaction can be averaged over the oscillation cycle to produce a corresponding scalar representing the level of probe-sample interaction to be maintained as probe 104 is scanned over surface 108.

Mechanical systems 116 can further include a course positioning system for coarse adjustment along the z-axis for engagement and disengagement of the interaction between probe 104 and surface 108. In some embodiments, the coarse adjustment can provide a greater magnitude or rate of displacement than the fine motion or adjustment corresponding to the standard range of motion or amplitude of cantilever 102, probe 104, or sample 106 during scanning inspection. In some applications, such as where the topography of surface 108 makes a dramatic change beyond the standard range of actuator 114 or mechanical systems 116, the course positioning system can be used to reposition cantilever 102 or sample 106 for optimal probe-sample interaction. In some embodiments, the coarse adjustment can be limited in its resolution along the z-axis, and thus may not as useful as fine adjustment for scanning.

In one embodiment, the course positioning system can further include a coarse adjustment along the x- and y-axes, for more rapidly positioning probe 104 relative to sample 106. In some embodiments, coarse adjustment along the x- and y-axes can provide a greater rate of displacement than the fine adjustment corresponding to the standard range of motion during x- and y-axis scanning. Course adjustment along any of the axes can be used when establishing an initial position of probe 104 relative to sample 106. Course adjustment can also be used when shuttling the relative position between the probe 104 and the sample 106 to globally re-position probe 104 to specific locations in remote regions of the sample 106. As compared to fine adjustment, positioning of probe 104 relative to sample 106 using course adjustment is more rapid, but less precise. For example, in one embodiment, while using the course adjustment, the actual positioning of the probe 104 relative to sample 106 as compared to the intended positioning of probe 104 relative to sample 106 can vary by more than 1 micron. In addition to the course adjustment resolution being more than 1 micron, course adjustment can also require a larger field of view to determine a desired location. In one embodiment, the field of view can be more than 100 microns.

In one embodiment, probe positioning system is configured to adjust the relative positioning between probe 104 and sample 106 to optimize probe-sample interaction. The probe positioning system can include actuator 114, and can also include the actuators of mechanical systems 116. The probe positioning system can also include actuator control circuitry, such as portions of controller 118, amplifier 120, feedback network 122, and load isolator 124. In one embodiment, controller 118 includes a plurality of modules to aid in probe positioning.

In one embodiment, SPM system 100 includes monitor 130 adapted to monitor the probe-sample interaction. In one embodiment, SPM system 100 can include an optical-based positioning system, wherein monitor 130 produces signal 132 representing the probe-sample interaction, and feeds signal 132 to controller 118, which compares signal 132 to a setpoint signal representing an amount of probe-sample interaction to be maintained. In one embodiment, controller 118 produces probe positioning signal 126, which is amplified by amplifier 120 to produce cantilever driving signal 128. In one embodiment, amplifier 120 is implemented with discrete and integrated electrical or electronic components on a single circuit board. In other embodiments, the circuit of amplifier 120 spans a plurality of interconnected circuit boards, or a plurality of separate interconnected enclosures. Amplifier 120 can cooperate with internal feedback network 122 and load isolator 124 to further improve or refine probe positioning.

In one embodiment, the optical-based positioning system works in conjunction with the probe positioning system. In one embodiment, optical-based positioning system scans an area on sample 106 greater than 1 micron in diameter or when measured from one edge of the scan area to the other edge of scan area. The precision of the actual position of probe 104 relative to sample 106 based on a signal from the optical-based positioning system can be limited by the imaging resolution of monitor 130.

In other embodiments, other types of control topologies are possible. For example, a feed forward control system, or a model-based control system, can be utilized to provide adjustment of the relative positioning between probe 104 and sample 106 to optimize probe-sample interaction. In other words, this system can employ other data such as known coordinate systems for more precise positioning or adjustment between probe 104 and sample 106 to optimize probe-sample interaction. In one embodiment, coarse motion system and fine motion system operate together to enable precise x-y-z positioning. In a related embodiment, the positioning precision is precise to within an order of magnitude of the imaging resolution (e.g., to within 5-10 nm). More generally, the positioning system is precise to the point of providing probe-sample positioning sufficiently precise to adjust the relative position between probe 104 and sample 106 with sub-micron resolution.

In one embodiment, SPM system 100 includes monitoring system, wherein monitor 130 utilizes a laser and interferometer to measure deflection of cantilever 102. In one embodiment monitor 130 produces signal 132 representing the probe-sample interaction, and feeds signal 132 to controller 118. Controller 118 produces probe positioning signal 126, which is input to analyzer 134 as a representation of the topology of surface 108 to produce a three-dimensional image of the nanoscale features in the scanned area or target region. In an oscillating mode embodiment, the probe-sample interaction can be monitored by observing changes in the oscillation characteristics of cantilever 102, such as in a shift in phase offset of the oscillation due to a change in resonance characteristics from the probe-sample interaction. In one embodiment, monitor 130 is rotatably shiftable, can translate along the x-y plane, or a combination thereof. Movement of monitor 130 can also be characterized by both a course and fine level of adjustment or movement.

Figure 2:
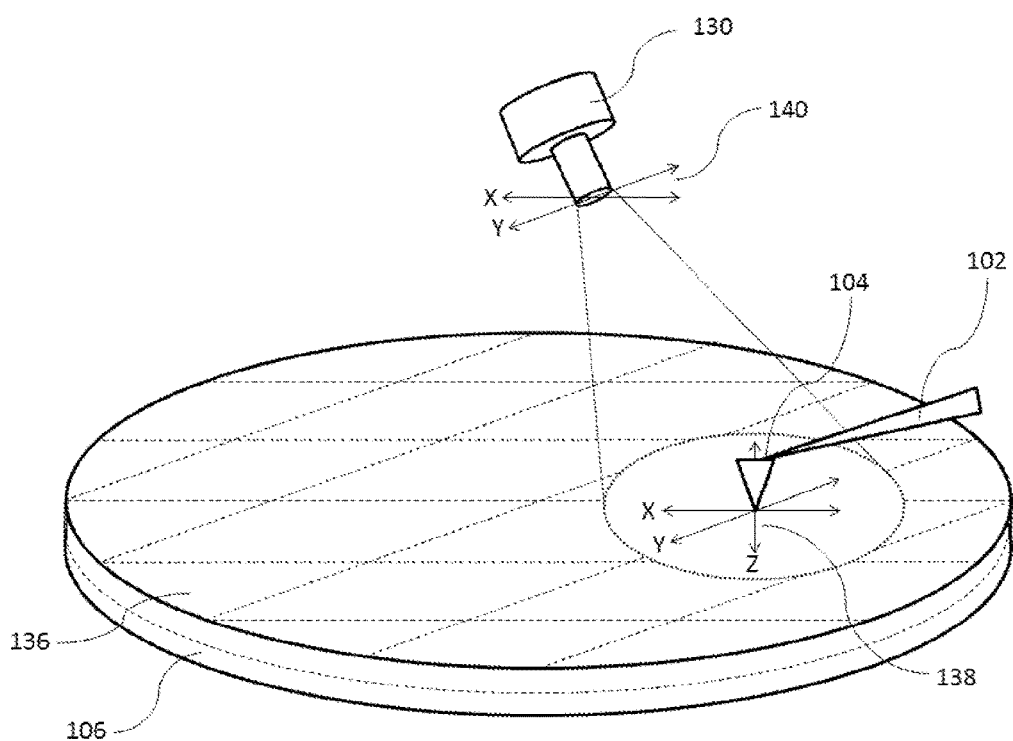
FIG. 2 is a diagram depicting the relationship among the coordinate systems characterizing the sample, relative motion of the probe and relative motion of portions of the optical-based positioning system in accordance with an embodiment of the disclosure.

Referring to FIG. 2, sample 106, characterized by a sample-specific coordinate system 136 is depicted. The relationship of sample-specific coordinate system 136 to SPM coordinate system 138 and monitor system coordinate system 140 is also depicted.

In one embodiment, sample-specific coordinate system 136 provides a coordinate system for sample 106 along the x-y-z axes. In another embodiment, the sample-specific coordinate system 136 is limited to the x-y axes. The sample-specific coordinate system 136 can be used to define specific locations on a sample 106. See FIG. 3 and accompanying text for additional discussion.

In one embodiment, SPM coordinate system 138 provides a coordinate system to aid in the relative positioning between probe 104 and sample 106 along the x-y-z axes. In another embodiment, the SPM coordinate system 138 is limited to the x-y axes. The SPM coordinate system 138 can be employed by the probe positioning system to provide sub-micron resolution during operation.

In one embodiment, monitor coordinate system 140 provides a coordinate system for monitor 130 along the x-y axes. The monitor coordinate system 140 can be used to define the location to be monitored during operation.

Figure 3:
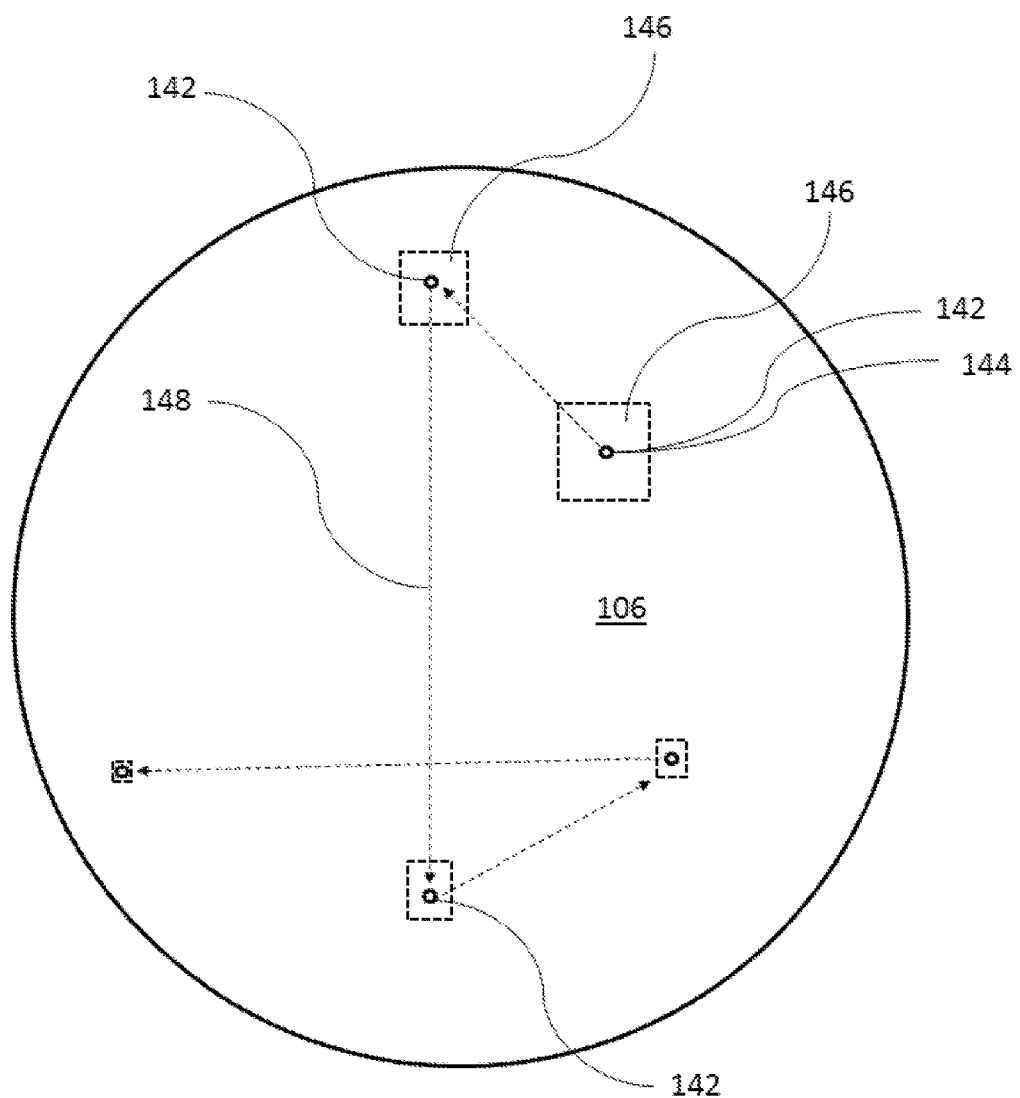
FIG. 3 is a top view depicting a sample with specific locations characterized by a sample-specific coordinate system in accordance with an embodiment of the disclosure.

Referring to FIG. 3, an exemplary sample 106, which includes a plurality of features of interest 142, is depicted. As referenced above, the specific locations of the plurality of features of interest 142 on sample 106 can be defined according to sample-specific coordinate system 136. In one embodiment, feature of interest 142 can include a registration point, otherwise known as a fiducial marker 144. Feature of interest 142 can include feature identification information. Such feature identification information can include structural properties for one or more associated features of interest 142, including for example, a point of reference, a known location within or proximate feature of interest 142, a measure of feature of interest 142, or a portion of a border or boundary of feature of interest 142. One or more features of interest 142 can also be used to orientate or deskew a field of view of sample 106.

In one embodiment, a representation of the specific locations of various known points or features of interest 142 within sample-specific coordinate system 136 can be stored as location information. Such location information can be, for example stored in a sample data module. In one embodiment, the location information can include a representation of the location of each of a plurality of features of interest 142 on sample 106, or other specific locations including feature identification information. In some embodiment, the location information can be used by the SPM system 100 to adjust a relative positioning between the probe 104 and sample 106, thereby reducing the amount of time spent looking for a particular feature of interest 142 to be scanned. In particular, as opposed to a purely optical-based positioning system, interaction with location information allows for sub-nanometer resolution.

In one embodiment, by extrapolating, for example, feature of interest 142 coordinate data, the probe positioning system can be used to quickly and accurately follow a line of travel 148 to the coordinate of the feature of interest 142. Once probe 104 is positioned proximate feature of interest 142, a target region 146 is scanned to obtain topographic data. In some embodiments, one or more features of interest 142 can be globally positioned local to one another, such that target regions 146 touch or overlap with one another. Alternatively, one or more features of interest 146 can be globally positioned remote from one another, such that course positioning system can be is typically used when adjusting the relative position between probe 104 and sample 106.

One benefit of using location information is that the conventional uses of arbitrary deskew and origination points are negated, thereby allowing navigation to a feature of interest 142 defined solely upon the feature of interest's design data location, which reduces the burden of automated measurement setup by removing the manual site navigation process. Accordingly, using known coordinates and feature definitions as provided in the location information, the relative position of probe 104 and sample 106 can be rapidly repositioned with a higher degree of accuracy, thereby improving the efficiency of the scanning operation.

Generally, when sample 106 is positioned relative to probe 104 for scanning, the positional offset, rotational offset, or skew is determined. In some embodiments, this involves managing the relationship between the sample-specific coordinate system and the stored location information data to account for such offset or skew. In SPM systems 100 with monitor 130, the relative position of probe 104 can be navigated to the vicinity an initial position using the optical-based positioning system. An initial scan by probe 104 can be performed to determine the precise location of the feature identification information. In some embodiments, it may be necessary to scan one or more specific locations to establish the relationship between the between the sample-specific coordinate system and the stored location information data.

In one embodiment, the optical-based positioning system is used for general (coarse) probe navigation. In this embodiment, the position of probe 104 is moved relative to target region 146 of the sample 106 in which a known feature of interest 142 is located. The optical-based positioning system is used to locate the known feature of interest 142, or the vicinity thereof. The inherent digital resolution of the optical-based positioning system may preclude precise positioning probe 104, as the apex 112 and the specific features of sample 106 are so small that they are not visually observable. For this reason, a scan of a target region 146 may be necessary to locate the feature identification information. Once the feature identification information has been located, adjustments can be made for alignment errors. A scan of the feature of interest 142 is then recorded and integrated into the automated software along with the alignment error, thus extending the capabilities of the SPM system 100. In one embodiment, the alignment error can be determined after finding each subsequent feature of interest 142, even when the optical-based positioning system is no longer used, and navigation of probe 104 relative to sample 106 is directly primarily by location information data. Where alignment errors can account for skew, positional offset, rotational offset, and corrections of scale, the dynamic accounting to offset these errors can improve the positioning accuracy of probe 104 relative to sample 106.

Once probe 104 is positioned at a feature of interest 142, the SPM system 100 can begin a registration scan of target region 146. If the feature of interest 142 has a known baseline coordinate provided by location information, an alignment errors can be determined. The alignment error can be the difference between the initial probe 104 placement relative to sample 106 and the actual location fiducial 301 on sample 106. The alignment error can be applied to the stored location information data or loadable CAD location information data in subsequent probe 104 placement relative to sample 106. The SPM system 100 can again begin a registration scan of a target region 146 to locate feature of interest 142. The alignment error can again be determined and again applied in subsequent iterations of feature of interest 142 location. In some embodiments, the target region 146 can be reduced in size to account for the reduction in alignment error.

In an embodiment, utilizing the location information improves the efficiency of operations when performed globally across the entire surface 108 or a substantial portion of the entire surface of sample 106, as such an embodiment is less reliant on optical-based positioning system data that is restricted locally within a field of view of the video-based or optical microscope-based positioning system. In one embodiment, a single feature of interest 142 serves as the baseline for the entire sample 106. Thus, it is only necessary to move the optical-based positioning system a single time, such that optical field of view is aligned with the first specific location to be scanned, thereby saving valuable processing time. Features of interest 142 with locations correlated with stored location information data or loadable CAD location information data, can be located in target regions or scan areas remote from the target region of a previous, initial or preliminary scan.

The system includes various modules, each of which is constructed, programmed, configured, or otherwise adapted, to carry out a function or set of functions. The term module as used herein means a real-world device, component, or arrangement of components implemented using hardware, such as by an application specific integrated circuit (ASIC) or field-programmable gate array (FPGA), for example, or as a combination of hardware and software, such as by a microprocessor system and a set of program instructions that adapt the module to implement the particular functionality, which (while being executed) transform the microprocessor system into a special-purpose device.

A module can also be implemented as a combination of hardware and software, with certain functions facilitated by hardware alone, and other functions facilitated by a combination of hardware and software. In certain implementations, at least a portion, and in some cases, all, of a module can include the processor(s) of one or more computers that execute an operating system, system programs, and application programs, while also implementing the module using multitasking, multithreading, distributed (e.g., cluster, peer-peer, cloud, etc.) processing where appropriate, or other such techniques. Accordingly, each module can be realized in a variety of suitable configurations, and should generally not be limited to any particular implementation exemplified herein, unless such limitations are expressly called out.

In addition, a module can itself be composed of more than one sub-modules, each of which can be regarded as a module in its own right. Moreover, in the embodiments described herein, each of the various modules corresponds to a defined functionality; however, it should be understood that in other contemplated embodiments, each functionality may be distributed to more than one module. Likewise, in other contemplated embodiments, multiple defined functionalities may be implemented by a single module that performs those multiple functions, possibly alongside other functions, or distributed differently among a set of modules than specifically illustrated in the examples herein.

The following discussion is intended to provide a brief, general description of a suitable computing environment in which an SPM coordinate system can be implemented. Although not required, at least portions of the SPM coordinate system will be described in the general context of computer-executable instructions being executed by a computer, for example, a hand held computer, a personal computing system, or a controller.

Figure 4:
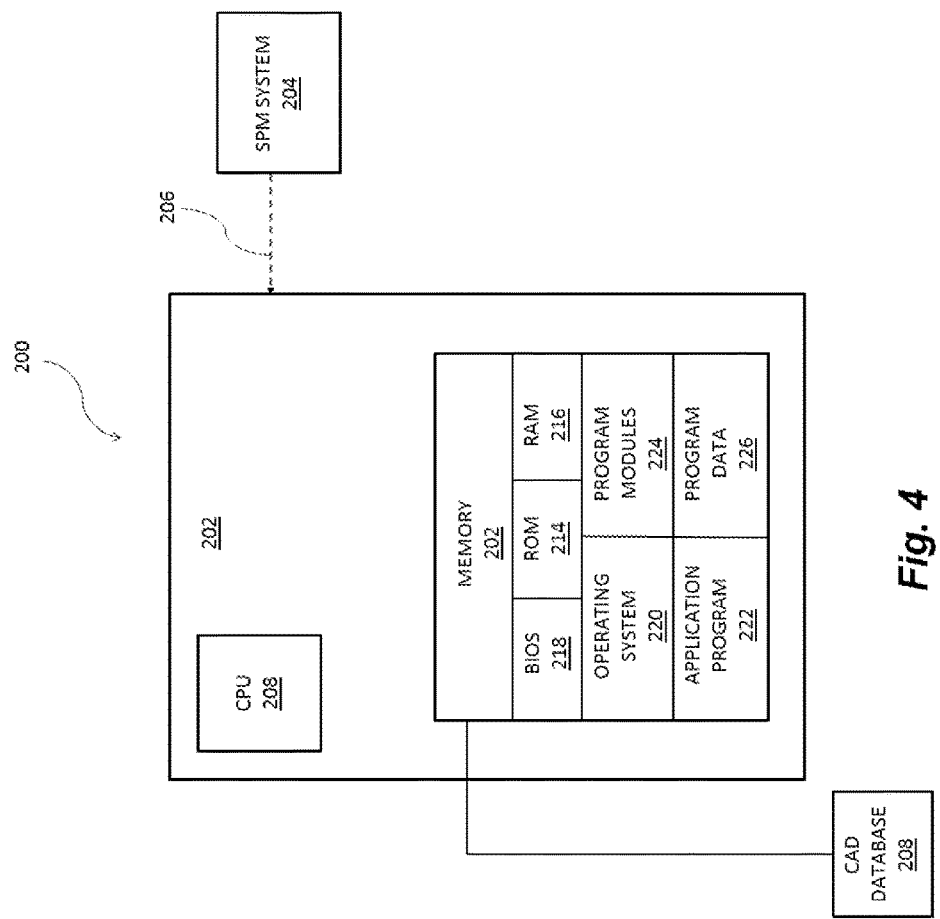
FIG. 4 depicts the architecture of a SPM coordinate registration module in accordance with an embodiment of the disclosure.

Referring to FIG. 4, an embodiment of a SPM coordinate registration module 200 is depicted. In one embodiment, SPM coordinate registration module 200 includes a computing system 202 and at least one sample data module 204 communicatively coupled via communications link 206. Sample data module 204 is configured to store location information for sample 106. As discussed above, the location information is a representation of specific locations within sample-specific coordinate system 136. Location information can be programmed for a single sample, a group of related samples, all samples used by a given plant or customer, or some or all samples provided by a given manufacturer. In one embodiment, sample data module 204 can comprise computer aided design (CAD) data representing the structure of sample 106.

SPM coordinate registration module 200 is configured to manage a dynamic relationship between the sample-specific coordinate system and the SPM coordinate system by determining a set of alignment errors between the sample-specific coordinate system and the SPM coordinate system and applying corrections to the SPM coordinate system to offset the alignment errors.

Computing system 202 is configured to execute computer-readable instructions, such as computer software. In one embodiment, the computing system 202 is controller 118. In an embodiment, the computing system 202 is programmed to generate and store instructions for execution as part of the probe 104, sample 106, and optical-based positioning and scanning operations.

The communications link 206 connects the sample data module 204 and computing system 202. In various embodiments, the communications link 206 can include serial or parallel connections, wired or wireless connections, and a direct or networked connection to a computer. Additionally, the SPM system 204 and computing system 202 can communicate using any protocol appropriate for data communication. Examples of network connections to a computer include Intranet, Internet, and LAN (e.g., Ethernet). Examples of wired connections to a computer include USB, RS-232, Firewire, and power-line modem connection. Examples of wireless connections include bluetooth, 802.11a/b/g, infrared (IR), and radio frequency (RF).

The computing system 202 includes a general purpose computing device and can execute program modules as disclosed below. The computing system 202 includes at least one central processing system (CPU) 208. A variety of processing units are available from a variety of manufacturers, for example, Intel or Advanced Micro Devices. Computing system 202 also includes a system memory 210, and a system bus that couples various system components including the system memory 210 to the processing unit 208.

The system memory 210 can include read only memory (ROM) 214 and random access memory (RAM) 216. A basic input/output system (BIOS) 218, containing the basic routines that help transfer information between elements within the computing system 202, such as during start up, is typically stored in the ROM 214.

In an embodiment, the computing system 202 can also include a secondary storage device (not shown), such as a hard disk drive, flash memory device, etc., for storing data in non-volatile fashion of program instructions, data structures, scratchpad data, and other data for the computing system 202. In other embodiments, other types of computer-readable media, capable of storing data, can be used in the system 202.

In various embodiments, a number of program modules can be stored in memory 202, including an operating system 220, one or more application programs 222, other program modules 224, and program data 226. A user can enter commands and information into the computing system 202 through an input device (not shown). Examples of input devices include a keyboard, mouse, microphone, joystick, digital camera, touch screen, and the like. These and other input devices are often communicatively connected to the processing unit 208. A display device (not shown), such as a monitor or touch screen LCD panel, can also be connected to the system 202.

In one embodiment, computing system 200 can include a CAD database 228 for storage of CAD data representing the structure of sample 106. The CAD database 228 can be accessible via the memory 210 (either integrated therein or external to) and can be formed as any of a number of types of databases, such as a hierarchical or relational database. Thus, CAD database 228 can be maintained by the computing system 202 that includes a processor interfaced with storage media containing instructions executable by the processor, and data to be stored. CAD database 228 can be programmed for a single sample, a group of related samples, all samples used by a given plant or customer, or some or all samples provided by a given manufacturer.

A computing device, such as computing system 202, typically includes at least some form of computer-readable media. Computer readable media can be any available media that can be accessed by the computing system 202. By way of example, and not limitation, computer-readable media might comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store the desired information and that can be accessed by the computing system 202.

Communication media typically embodies computer-readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media. Computer-readable media may also be referred to as computer program product.

Figure 5:
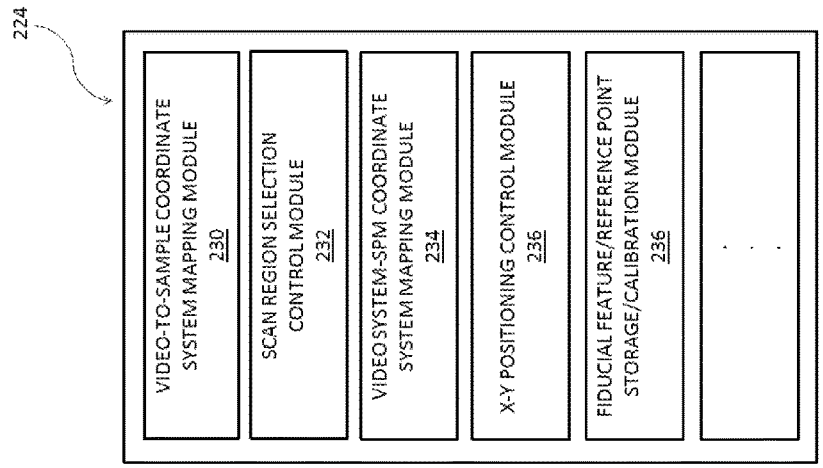
FIG. 5 depicts the architecture of a program module in accordance with an embodiment of the disclosure.

Referring to FIG. 5, in one embodiment, computing system 202, which in some embodiments is controller 118, can be provided with one or more operational program modules 224 within system memory 210. The various program modules 224 can include, but are not limited to, video-to-sample coordinate system mapping module 230, scan region selection control module 232, a video system-SPM coordinate system mapping module 234, an x-y positioning control module 236, and a fiducial feature/reference point storage/calibration module 238.

In one embodiment, video-to-sample coordinate system mapping module 230 forms part of optical-based positioning system. In this embodiment, video-to-wafer coordinate system mapping module 230 receives input from monitor 130 to provide information for the adjustment of the relative positioning between probe 104 and sample 106. In one embodiment, optical-based positioning system is employed in determining at least a first position to be scanned on sample 106. Information from the video-to-sample coordinate system mapping module 230 can be provided to x-y axes positioning control module 236, which can be included as part of probe positioning system for adjusting a relative position between probe 104 and sample 106. In one embodiment, data from a scan, information from the optical-based positioning system, or a combination of both can be provided at least one of the video system-SPM coordinate system mapping module 234 or fiducial feature/reference point storage/calibration module 238 for determining a set of preliminary alignment errors between the optical-based positioning system and sample-specific coordinate system.

In some embodiments, preliminary positioning of probe 104 relative to sample 106 largely based on information from the optical-based positioning system. However, because the relative position of the apex 112 and the specific nanoscal features of the sample 106 are not visually observable, a scan of a defined target region may be required to positively locate feature identification information. In one embodiment, use of SPM coordinate system can provide more precise positioning of probe 104 relative to sample 106. Some inherent errors between can, however, still exist between SPM coordinate system and sample-specific coordinate system. In one embodiment, to improve the accuracy of subsequent placement and to potentially reduce the subsequent target regions to be scanned, a set of alignment errors between the sample-specific coordinate system and SPM coordinate system can be determined and applied to offset the alignment error.

In one embodiment, the scan region selection control module 232 communicates with the probe positioning system and SPM coordinate registration module to determine alignment errors and apply offsets. In one embodiment, the scan region selection control module 232 causes the probe positioning system to shuttle the relative position between the probe and the sample from an initial position on the sample to a subsequent position on the sample. In some embodiments, the subsequent position is located remotely from the initial position, such that course adjustment is employed in the shuttling process. Following positive location of the subsequent feature during a scan of the subsequent target region, a set of alignment errors is determined. The scan region selection control module 232 then computes and facilitates the implementation of corrections of the SPM coordinate system necessary to offset the alignment errors. In one embodiment, this process is repeated for each subsequent position on the sample, thereby refining the accuracy of the positioning of probe 104 relative to sample 106.

Referring to FIG. 6A, a process flow diagram illustrating an example embodiment of a SPM scan process 300 is depicted. The scan process begins at step 302 by the optical-based positioning system locating a preliminary position on sample 106. Preliminary position can be proximate one or more specific locations on sample 106, for example the specific location can be a feature of interest 142, such as a fiducial marker 146. At 304, a determination is made of whether feature identification information of the specific location has been found. In one embodiment, feature identification information of sample 106 can be found via pattern recognition by the optical-based positioning system alone. If the specific location is found by optical-based pattern recognition, at step 306, probe positioning system adjusts the relative position between probe 104 and sample 106, and scanning of a target region commences. At step 310, the scanning process is completed.

Where the optical-based positioning system alone lacks the precision necessary to position probe 104 relative to sample 106 such that probe-sample interaction occurs between apex 112 and the nanoscale feature of interest at the specific location, the SPM coordinate system can be used at step 308. Referring to FIG. 6B, step 308 is further broken down into several steps or operations. At step 312, the process for using the SPM coordinate system begins. At step 314 location information for the specific location is provided.

For each specific location the steps within box 316 are performed to determine an updated set of alignment errors, so that corrections can be made to offset the alignment errors. At step 318, probe positioning system adjusts a relative positioning between the probe 104 and sample 106, such that probe 104 interacts with the sample surface 108 proximate a target region for the specific location.

At step 320, the target region is scanned and data comprising feature identification information including structural properties of the specific location is collected. The data collected in step 322 can be based on pattern recognition over the entire scan or based on two scans where one scan collects feature location data along the x-axis and another scan collects feature location data along the y-axis. At step 322, the specific location is scanned and captured.

At step 324, scan region selection control module 232 determines a set of alignment errors between the SPM coordinate system and the sample-specific coordinate system by calculating the displacement vector required to create probe-sample interaction between apex 112 and a position at the specific location. In some embodiments, the determined set of alignment errors can replace a previously determined set of alignment errors. At step 326, the scan region selection control module 232 communicates with the SPM registration module 200 to apply corrections to the SPM coordinate system to offset the alignment errors. In one embodiment, the corrections are the determined vector, magnitude and angle of the determined vector, or an inverse of the determined vector. At step 328, step 316 can be repeated for subsequent specific locations on sample 106, each time refining the relative position between probe 104 and sample 106, by incrementally adjusting for alignment error. In some embodiments, as the alignment error is reduced the target region for location of feature identification information can also be reduced. At step 310, the scanning process is completed.

The logical operations of the various embodiments of the present disclosure described herein are implemented as: (1) a sequence of computer implemented operations running on a computing system; and/or (2) interconnected machine modules within the computing system. Modules represent functions executed by program code such as commonly available programming languages or as the code found in a dynamic-link library (DLL). The implementation used is a matter of choice dependent on the performance requirements of the SPM coordinate system and the computing systems with which it interfaces. Accordingly, the logical operations making up the embodiments of the present disclosure can be referred to alternatively as operations, modules, and the like.

Figure 7:
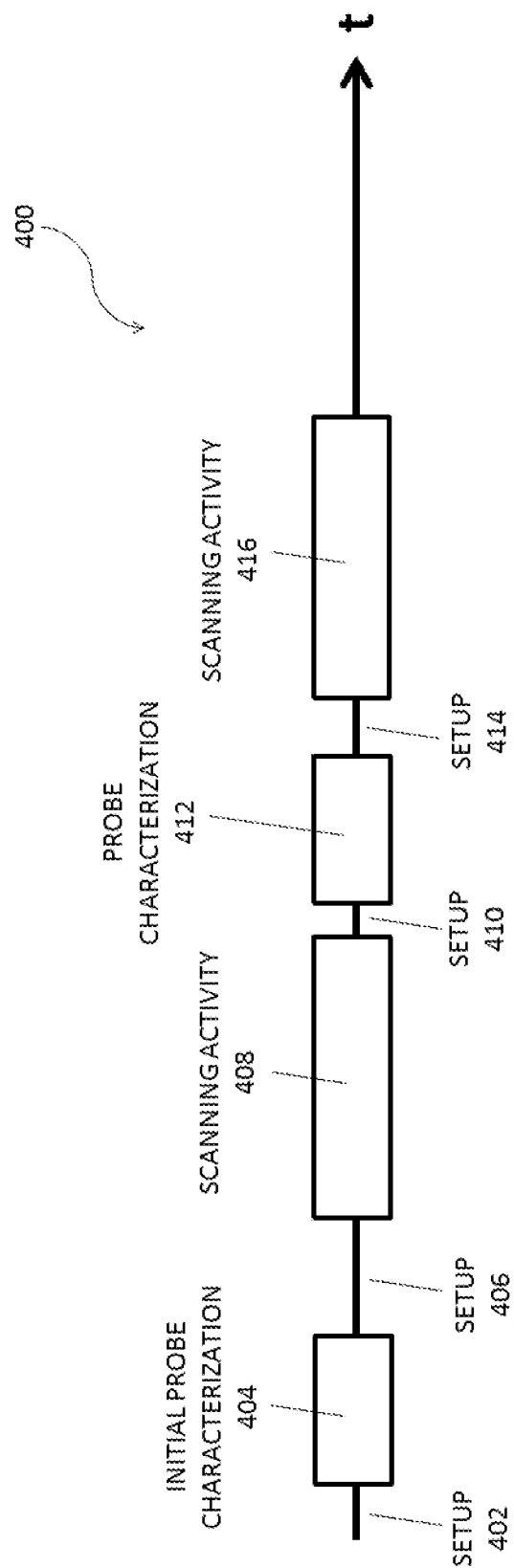
FIG. 7 depicts an operating regime for a SPM system in which various operations are plotted along a timeline.

Referring to FIG. 7, an example of a typical operating regime 400 for a SPM system 100, in which periods of probe characterizations and periods of scanning activity are plotted along timeline t is depicted. At 402, the SPM sets up to conduct initial probe characterization 404, by positioning probe 104 relative to a tip characterizer structure. At 404, the probe characterization is performed, and the data produced from the probe characterization is stored. The probe characterization operation results in the measurement of one or more tip shape attributes of the probe. Tip shape attributes comprise any measurements of probe geometry that can have a potential impact on measured data of a sample.

At 406, probe 104 is positioned relative to sample 106 to scan one or more specific location on a given sample 106. As described above, in some embodiments, an SPM coordinate registration module manages a dynamic relationship between the sample-specific coordinate system and the SPM coordinate system by applying corrections to the SPM coordinate system to correct for alignment errors between the sample-specific coordinate system and the SPM coordinate system is employed to improve the accuracy of the positioning of probe 104 relative to sample 106. Accordingly, as the SPM system increasingly relies on the SPM coordinate system, as opposed to the optical-based positioning system, the time spent searching for particular feature of interest 142 to be scanned is reduced.

At 408, the sample is scanned and data is obtained. The most common form of data comprises a topographic image that is representative of the structure on the sample surface, for example a three-dimensional image of the scanned area. Alternatively, the data can be in the form of a scan profile. In addition, the data can also include electrical or magnetic profiling of the sample, measurements of cantilever amplitude, deflection, frequency, phase, tunneling current, conductivity, optical properties, compositional maps, or any other measurement enabled by SPM techniques. Metrology measurements such as critical dimension (CD) measurement, nanomechanical measurements such as measurements to obtain surface elasticity information about the sample, and any other type of scanning probe activity that involves interaction between the scanning probe and some material (of the sample or of some other structure) can also be performed. For example, scanning activity 408 can take place at a single feature of interest 142 on the sample, or can include data obtained at multiple features of interest 142 (involving repositioning the probe relative to the sample from one feature to the next). At each feature of interest 142, the scanning can include a single or multiple readings at a single point or a single CD measurement, or may include taking a multiplicity of readings, such as in a multi-line surface profile scan, or a plurality of CD measurements.

At optional 410, the probe-sample interaction is disengaged and probe 104 is again aligned with the tip characterizer structure. At 412, the probe tip is characterized to assess the extent of change resulting from the preceding scanning activity of 208.

At 414, the relative position between probe 104 and sample 106 is shuttled to a subsequent position. As an updated set of alignment errors between the sample-specific coordinate system and the SPM coordinate system is determined and applied as an offset to the SPM coordinate system, the relative positioning becomes increasingly precise. Accordingly, with each subsequent shift in relative position, the time spent searching for the subsequent feature of interest is reduced, thereby reducing both the total operating time for each sample and reducing the amount of wear on probe tip. Further scanning activity 416 is then carried out.

Where any feature of the system or method is disclosed as being "configured to" achieve or perform a stated result or function, the system or method is constructed to, programmed to, or otherwise tuned, calibrated, or adjusted, to have the necessary mechanical or electrical structures, and algorithms, to perform the stated result or function.

Persons of ordinary skill in the relevant arts will recognize that embodiments may comprise fewer features than illustrated in any individual embodiment described above. The embodiments described herein are not meant to be an exhaustive presentation of the ways in which the various features may be combined. Accordingly, the embodiments are not mutually exclusive combinations of features; rather, embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted. Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended. Furthermore, it is intended also to include features of a claim in any other independent claim even if this claim is not directly made dependent to the independent claim.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of Section 112, sixth paragraph of 35 U.S.C. are not to be invoked unless the specific terms "means for" or "step for" are recited in a claim.

The invention claimed is:

1. A scanning probe microscope (SPM) system for characterizing target regions of a sample, the SPM system comprising:
   a probe including a tip adapted to interact with nanoscale features of the sample to generate SPM data, wherein a size of the nanoscale features is substantially smaller than a wavelength of visible light;
   an optical positioning system adapted to detect a plurality of macro-scale fiducial markers that are each larger than the wavelength of visible light to generate optical data;
   a memory configured to maintain a set of physical offset alignment errors between the optical data and the SPM data;
   an SPM coordinate registration module configured to maintain:
      location information for each of a plurality of nanoscale features of interest, and
      structural information for each of the plurality of nanoscale features of interest,
   a probe positioning system configured to adjust a relative positioning between the probe and the sample by:
      repositioning the probe to one of the plurality of macro-scale fiducial markers identified in the optical data;
      scanning, via the probe, at a target region corresponding to the one of the plurality of macro-scale fiducial markers to produce a nanoscale three-dimensional image of the target region, wherein the target region includes one of the plurality of nanoscale features of interest; and
      updating the set of physical offset alignment errors based upon a difference between the nanoscale three-dimensional image of the target region, the optical data, and the SPM data.

2. The SPM system of claim 1, wherein the probe is a critical dimension probe.

3. The SPM system of claim 1, further comprising a course positioning system configured to establish the initial position of the probe relative to the sample with a resolution of greater than 1 micron and a field of view of greater than 100 microns.

4. The SPM system of claim 1, wherein the optical positioning system is configured to detect the plurality of macro-scale fiducial markers within a scan area greater than 1 micron.

5. The SPM system of claim 1, wherein the location information for each of the plurality of nanoscale features of interest includes CAD data.

6. The SPM system of claim 1, wherein the plurality of macro-scale fiducial markers include at least two macro-scale fiducial markers that are at least 1 centimeter apart from one another.

7. The SPM system of claim 1, wherein the plurality of macro-scale fiducial markers include at least two macro-scale fiducial markers that are at least 1000 microns apart from one another.

8. The SPM system of claim 1, wherein the plurality of macro-scale fiducial markers include at least two macro-scale fiducial markers that are at least 100 microns apart from one another.

9. The SPM system of claim 1, wherein:
the probe positioning system is further configured, in response to performance of the scan of the target region, second position having a macro-scale feature on the sample and perform a scan of the target region corresponding to the second position; and
the SPM coordinate registration module is further configured to update the set of alignment errors corresponding to the second position and apply a new set of physical offset alignment errors to the SPM coordinate system.

10. The SPM system of claim 1, wherein the size of the nanoscale features is less than 10 nanometers across.

11. The SPM system of claim 9, wherein the target region associated with the second position is smaller than the target region.

12. A method of characterizing target regions of a sample, the method comprising:
generating optical data to identify a plurality of macro-scale fiducial markers that are all larger than the wavelength of visible light using an optical positioning system;
detecting, in a first region that is adjacent to the first macro-scale fiducial marker, a nanoscale feature of interest that is substantially smaller than the wavelength of visible light;
storing a set of physical offset alignment errors between the optical data and the SPM data in a memory;
maintaining, at a scanning probe microscope coordinate registration module:
location information for each of a plurality of nanoscale features of interest; and
structural information for each of the plurality of nanoscale features of interest;
adjusting a relative positioning between the probe and the sample with sub-micron resolution according to a probe positioning system by:
repositioning the probe to a first one of the plurality of macro-scale fiducial markers identified in the optical data scanning, via the probe, at a target region corresponding to the one of the plurality of macro-scale fiducial markers—to produce a nanoscale three-dimensional image of the target region, wherein the target region includes one of the plurality of nanoscale features of interest; and
updating the set of physical offset alignment errors based upon a difference between the nanoscale three-dimensional image of the target region, the optical data, and the SPM data.

13. The method of claim 12, wherein the probe is a critical dimension probe.

14. The method of claim 12, further comprising using a course positioning system to establish the initial position of the probe relative to the sample with a resolution of greater than 1 micron and a field of view of greater than 100 microns.

15. The method of claim 14, wherein the optical positioning system is configured to detect the plurality of macro-scale fiducial markers within a scan area greater than 1 micron.

16. The method of claim 12, wherein the location information for each of the plurality of nanoscale features of interest includes CAD data.

17. The method of claim 12, wherein the plurality of macro-scale fiducial markers include at least two macro-scale fiducial markers that are at least 1 centimeter apart from one another.

18. The method of claim 12, wherein the plurality of macro-scale fiducial markers include at least two macro-scale fiducial markers that are at least 1000 microns apart from one another.

19. The method of claim 12, wherein the plurality of macro-scale fiducial markers include at least two macro-scale fiducial markers that are at least 100 microns apart from one another.

20. The method of claim 12, further comprising:
in response to performance of the scan of the target region, shuttling the probe to a second position having a macro-scale feature on the sample;
performing a scan of the target region corresponding to the second position; and
updating the set of alignment errors.

21. The method of claim 12, wherein the size of the nanoscale features is less than 10 nanometers across.

22. The method of claim 12, wherein the target region associated with the second position is smaller than the target region.

23. A scanning probe microscope (SPM) system for characterizing target regions of a sample, the SPM system comprising:
probe means adapted to interact with nanoscale features of the sample, wherein a size of the nanoscale features is substantially smaller than a wavelength of visible light;
optical means adapted to detect macro-scale features that are larger than the wavelength of visible light;
means for maintaining SPM location information and SPM structural information for each of a plurality of nanoscale features of interest in remote regions of the sample according to a sample-specific coordinate system;
means for adjusting a relative positioning between the probe and the sample with sub-micron resolution according to an SPM coordinate system, wherein adjustment of the relative positioning includes:
means for shuttling of the relative positioning between the probe and the sample to globally reposition the probe to specific locations in remote regions of the sample; and
means for scanning within a target region to cause interaction of the probe tip and the nanoscale features of the sample to produce a three-dimensional image of that target region;

means for updating a set of physical offset alignment errors based upon a difference between the nanoscale three-dimensional image of the target region, the optical data, and the SPM data.

* * * * *

UNITED STATES PATENT AND TRADEMARK OFFICE
CERTIFICATE OF CORRECTION

PATENT NO. : 9,995,763 B2  
APPLICATION NO. : 14/630074  
DATED : June 12, 2018  
INVENTOR(S) : Osborne et al.

Page 1 of 1

It is certified that error appears in the above-identified patent and that said Letters Patent is hereby corrected as shown below:

In the Claims

Column 19, Line 26, after "region," please insert --shuttle to a--.

Signed and Sealed this  
Twenty-third Day of October, 2018

Andrei Iancu  
*Director of the United States Patent and Trademark Office*